Aug. 22, 1967    G. WEASEL, JR    3,337,238
SPLASH GUARD STRUCTURE
Filed Sept. 27, 1965    2 Sheets-Sheet 1
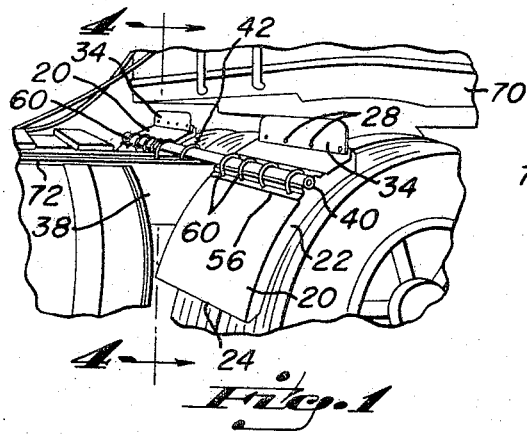
Fig. 1
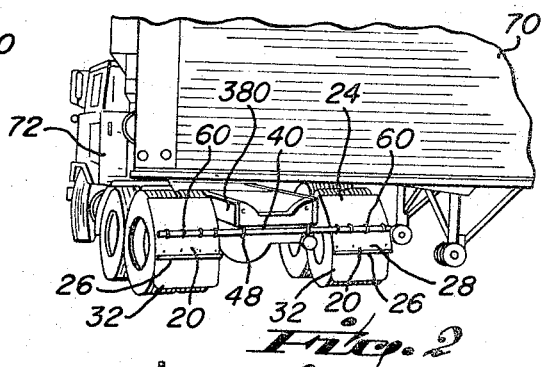
Fig. 2
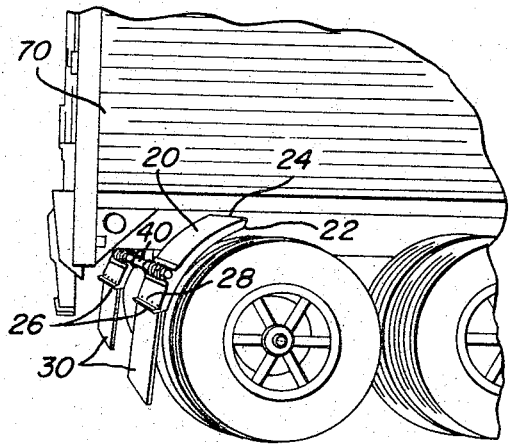
Fig. 3
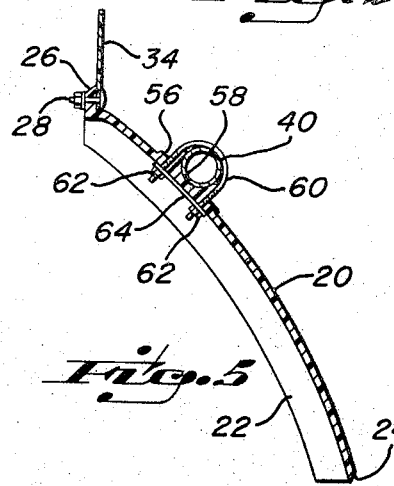
Fig. 5
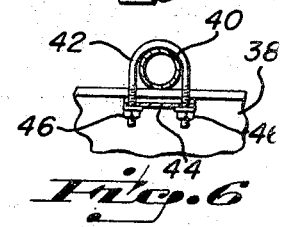
Fig. 6
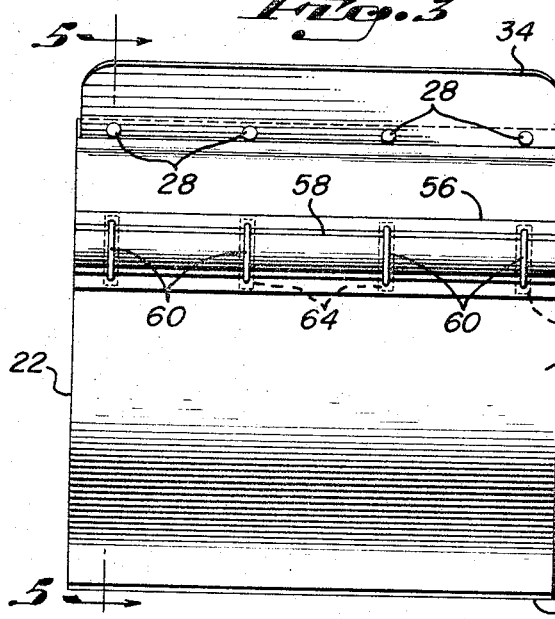
Fig. 4
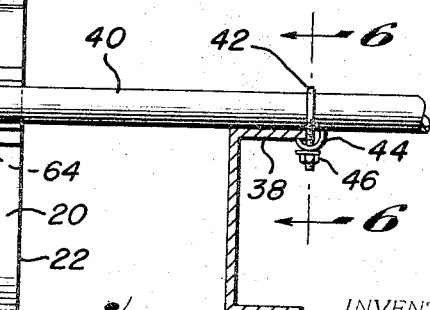
INVENTOR.
GEORGE WEASEL, JR.
BY J. Warren Kinney Jr.
ATTORNEY

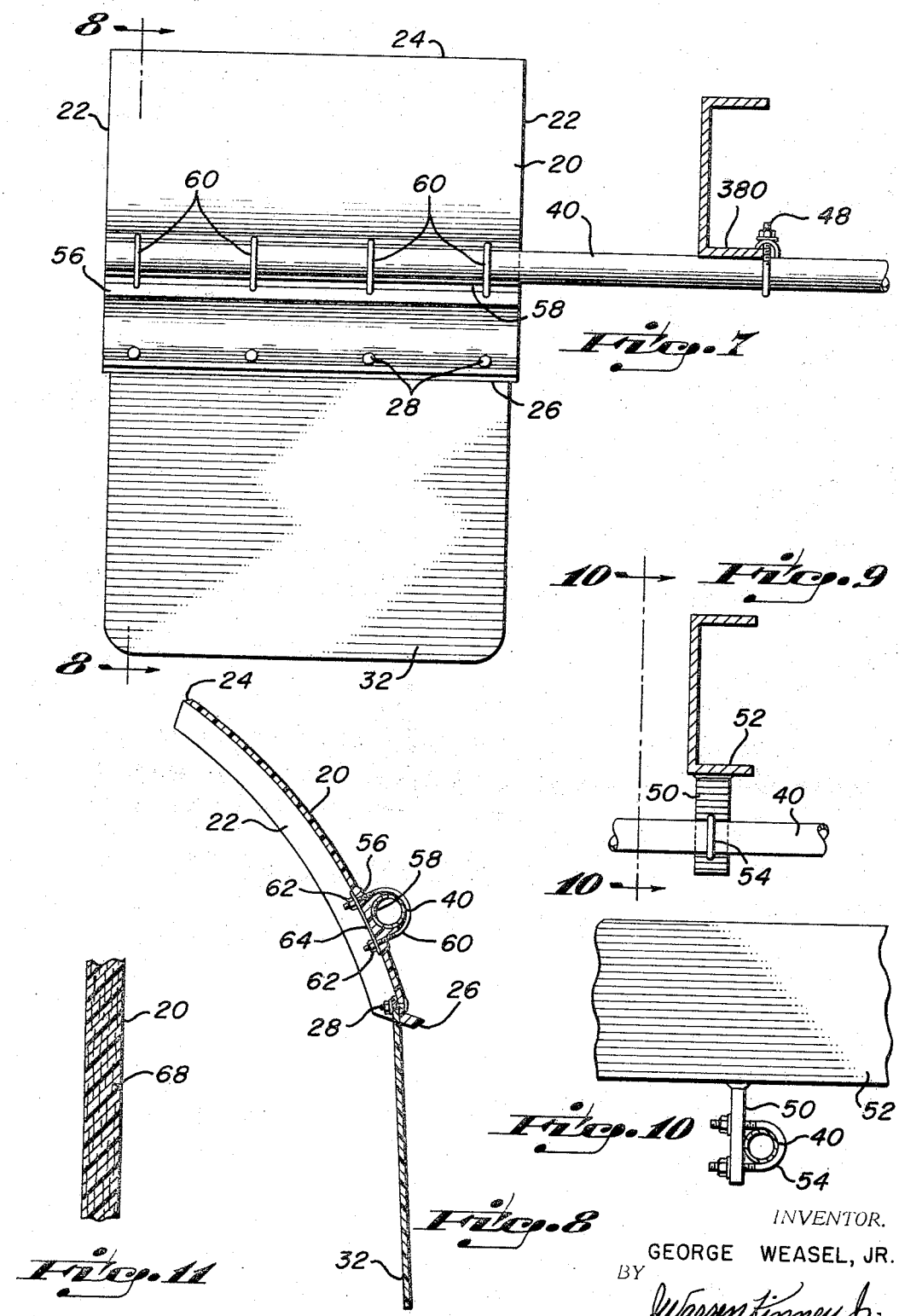

United States Patent Office 3,337,238
Patented Aug. 22, 1967

3,337,238
SPLASH GUARD STRUCTURE
George Weasel, Jr., McClure, Ohio, assignor to Advance Industries, Inc., London, Ohio, a corporation of Ohio
Filed Sept. 27, 1965, Ser. No. 490,383
8 Claims. (Cl. 280—154.5)

ABSTRACT OF THE DISCLOSURE

The splash guard molded from low-density polyethylene, is made and supported for end for end reversal so that it may be employed to guard the front tires or the rear tires. These guards are supported on substantially cylindrical bars which extend the width of the vehicle and are secured to the frame thereof. The means employed to secure the guard to the bars permits the guards to be slid on the bars and adjusted concentrically with the axis of the tire before being clamped in position.

---

The present invention relates to a splash guard structure for the wheels of tractor-trailer combination road vehicles. Such vehicles usually comprise a trailer having one or more pairs of dual wheels, and a motorized tractor equipped also with dual wheels. The purpose of the guards is to intercept water, dirt and objects thrown by the wheels when in motion.

An object of the invention is to provide a splash guard of the type mentioned, which is molded of tough and durable polyethylene, for imparting many advantages such as semi-rigidity, great strength without undue weight, lasting resistance to deteriorating effects of weather, road salts, sharp stones and other objects thrown by the wheels, acids, oils, tar, gasoline, and other substances likely to be encountered in the trucking industry.

Another object of the invention is to provide a splash guard having a high finish which resists the adherence of foreign materials or substances directed thereon, so that the guards may be considered self-cleaning for improved appearance.

A further object of the invention is to provide structural improvements in a splash guard, whereby one basic guard element is adapted for application to the several wheel sets of any tractor-trailer combination, so that the need for many different types or models of guards is eliminated, thereby resulting in great savings of manufacturing costs and installation expenses.

Another object is to effect savings in the merchandising and installation of splash guards of the character stated, by furnishing the guards and accompanying mounting accessories in compact kit form, with simple installation instructions applicable to various modes of mounting the guards in various service positions.

The foregoing and other objects are attained by the means described herein and illustrated upon the accompanying drawings, in which:

FIG. 1 is a fragmentary perspective view showing the splash guards of the invention covering the forward dual drive wheels of a tractor drawing a trailer.

FIG. 2 is a similar view, showing the guards covering the rear dual drive wheels of the same tractor.

FIG. 3 is a fragmentary perspective view showing the guards covering the dual rear wheels of a trailer.

FIG. 4 is a fragmental cross-sectional view taken on line 4—4 of FIG. 1.

FIG. 5 is a cross-section taken on line 5—5 of FIG. 4.

FIG. 6 is a fragmental cross-section taken on line 6—6 of FIG. 4.

FIG. 7 is a view similar to FIG. 4, showing the splash guard inverted and provided with a flap, to perform the service of FIG. 2 or 3.

FIG. 8 is a fragmental cross-section taken on line 8—8 of FIG. 7.

FIG. 9 is a cross-sectional view showing a vehicle frame element, and means for supporting a splash guard support rail thereon.

FIG. 10 is a cross-section taken on line 10—10 of FIG. 9.

FIG. 11 is an enlarged fragmental cross-section of the molded splash guard.

In the several drawing views, the reference character 20 denotes generally a molded polyethylene splash guard of the present invention. The guard may be arcuately formed in approximate conformity with the arcuacy of a standard wheel tire periphery, and is semi-rigid, with reinforcement provided preferably, though not necessarily, by the integral side walls 22 formed at opposite sides of the guard. Side walls 22 may be arched in conformity with the body arcuacy, and will preferably be of approximately the same thickness as the arcuate body portion. The side walls may be coextensive with the length of the body portion as shown, and are parallel to one another.

The splash guard may have a plain free end 24, which in some installations is depending (FIG. 1), or as in FIGS. 2 and 3, said plain free end 24 may be elevated.

Opposite the free end 24, the guard may be formed with an angularly disposed cross rib 26, arranged parallel to and coextensive with the length of free end 24. Cross rib 26 may be thickened or otherwise reinforced for strength, and along the length thereof may be provided a row of perforations to receive bolts 28 or other fasteners. The bolts or fasteners 28 may serve as attachment devices for flexible flaps such as 30, 32 and 34.

The drawings illustrate at 40 an elongate rigid metallic pipe, bar, or equivalent support means, extending transversely of the vehicle and its frame, and adapted to support the splash guards in operative position for intercepting throw-off from the vehicle tires. The support 40 should be of sufficient length to span the wheels of any one axle, and will have rigid attachment to the vehicle frame.

As shown in FIGS. 1, 4, 5 and 6, elongate support 40 may be attached to a vehicle frame element 38 with the use of U-bolts 42 or similar fasteners which will securely mount the member 40 transversely of the frame. According to FIGS. 4 and 6, the legs of the U-bolt rest against an edge of frame or channel member 38, and pass through an offset saddle member 44 which equalizes pressure on the channel member 38 and support 40, as the nuts 46 are tightened. As an alternative, the channel 38 might be drilled to receive the legs of U-bolt 42 in mounting the support 40.

The form of mounting above described is ordinarily suitable in applying splash guards over the forward dual wheels of a motorized tractor, FIG. 1, wherein support member 40 may be placed atop the vehicle frame members 38 and secured thereto. In other cases, such as depicted by FIGS. 2, 7 and 8, the support 40 might more desirably be slung beneath the vehicle frame members 38, and secured by U-bolt means 48 similar to that just described with reference to FIGS. 4 and 6.

In another circumstance as depicted by FIGS. 3, 9, and 10, the pipe or support 40 may be fixed to hangers 50 welded or otherwise securely mounted upon a vehicle frame element 52, the hangers being in the form of depending plates as shown. The hangers 50, usually two in number, may be drilled each to receive the parallel legs of a U-bolt 54 or equivalent fastener, for securing the support 40 against movement. This form of attachment may be preferred in installing the guards over the rearmost set of dual wheels of a trailer, FIG. 3.

It may here be noted that in molding the splash guard 20, there is provided a thickened pad portion or rib 56, FIG. 5, extended across the guard from one side wall 22 to the other, in parallelism with cross rib 26. The rib 56, at the convex face of the guard, may be channeled at 58 to provide an elongate transverse seat accommodating the pipe or support member 40. The pipe or member 40 may be retained firmly upon seat 58, by means of a plurality of U-bolts 60 or the like, whose parallel legs span the pipe and pass through rib 56 at opposite sides of the seat. The nuts 62 of U-bolts 60 may bear against metallic bearing straps 64 placed against the concave face of the guard.

The transverse channel or seat 58 for pipe or support 40, is desirably located close to and in substantial parallelism with edge rib 26, where the attachment of flaps is provided for. That is, the channel or seat 58 is remote from the plain edge 24 of the guard. By this arrangement, it is convenient to mount the splash guards for service in either of two positions, viz., with flaps such as 30 and 32 depending (FIGS. 3 and 2), or with the short flap 34 upstanding as in FIGS. 1, 4 and 5. The disposition of the flaps is of course determined by the location of the wheels requiring guarding, and in some instances the flaps may be longer than others, to most effectively control wheel splash. For example, the flaps 30 of FIG. 3 may be about four inches longer than the flaps 32 of FIG. 2. The upstanding relatively rigid flap or sheet 34 of FIG. 1 need not be extensive in the upward direction, in order to perform its required service of limited splash interception.

With reference to FIG. 11, there is depicted an enlarged cross-section of a splash guard such as 20. The reference character 68 indicates a multitude of short fiber glass strands molded with the polyethylene to impart added strength for the finished product. It is possible of course to otherwise reinforce the splash guard during the molding process.

The width of a splash guard should be ample to span the two wheels of a dual set. The width dimension accordingly may approximate two feet, more or less. A low density polyethylene is employed, by preference, in the molding operation.

In the drawings, the reference characters 70 and 72 indicate, respectively, a large trailer body, and the body of a motorized tractor hitched thereto.

A pair of the splash guards, a pair of plastic flaps, the pipe 40 and all of the hardware for mounting and assembling the structure upon a trailer or tractor, may be supplied as a compact kit at low cost, and with simple installation instructions. The purchaser may quickly and easily effect the installation, without the employment of skilled labor or special tools. Kits for the several installations herein specified, differ from one another only in the nature of the frame-engaging hardware.

It is to be understood that various modifications and changes may be made in the structural details of the apparatus, within the scope of the appended claims, without departing from the spirit of the invention.

What is claimed is:

1. An invertible splash guard for intercepting substances thrown by the front and rear tires of high speed road vehicles, comprising: a semi-rigid body arcuately formed in substantial conformity with a tire periphery, said body having a reinforced end including means for the detachable mounting of a flexible interceptor flap thereon in two different angular positions, and an opposite end; a pad portion spanning the convex face of the body, and disposed in substantial parallelism with the reinforced end of the body, said pad portion including an elongated seat; a horizontal support bar receiving said seat, and means for securing such support bar upon said seat, said last named means securing the body of the guard to the bar in supporting relation and for adjustment thereon both axially and angularly with the reinforced end of the body directed selectively downwardly toward the road when used to guard the rear tires, or upwardly in the opposite direction when used to guard the front tires; the pad portion and seat being spaced from the reinforced end of the body a distance substantially less than the distance between said pad portion and the opposite end of the body.

2. The device according to claim 1 wherein the elongated seat is concave and the horizontal support bar is cylindrical.

3. The device as set forth in claim 1, wherein the semi-rigid body is of one piece construction and molded from low-density polyethylene.

4. The invertible splash guard according to claim 1, wherein the body is a one-piece polyethylene body and includes oppositely disposed integrally molded side walls extending from the reinforced end of the body to the opposite end thereof, said side walls depending from the concave face of the arcuate body in a direction away from the seat of the pad portion aforesaid.

5. The device according to claim 1, wherein the means for securing the guard in axially and angularly adjusted position on the bar comprises a plurality of U-bolts whose legs span the support bar and pass through the pad portion of the guard and receive fasteners on the concave side thereof.

6. A splash guard kit for intercepting substances thrown by the tires of high speed road vehicles, comprising: a semi-rigid body arcuately formed in substantial conformity with a tire periphery, said body having a reinforced end including means for the detachable mounting of a flexible interceptor flap thereon, and an opposite end; a pad portion spanning the convex face of the body, and disposed in substantial parallelism with the reinforced end of the body, said pad portion including an elongate concave seat; a support bar, means for securing said support bar upon said seat, said means also securing the body of the guard to the bar in supporting relation, and for movements thereon to effect the concentricity of the said body with the tire and thus quickly clasp the guard in operative position.

7. The device according to claim 6, wherein the kit includes a pair of different length flexible flaps, and means for selectively securing each flap to the reinforced end of the splash guard body.

8. The kit as set forth in claim 6, wherein the semi-rigid body is molded from low-density polyethylene and the support bar is substantially cylindrical.

References Cited

UNITED STATES PATENTS

| | | | |
|---|---|---|---|
| 2,679,403 | 5/1954 | Howard et al. | 280—154.5 |
| 2,940,773 | 6/1960 | Eaves | 280—154.5 |
| 3,198,545 | 8/1965 | McDaniel | 280—154.5 |

BENJAMIN HERSH, *Primary Examiner.*

L. D. MORRIS, *Assistant Examiner.*